(12) United States Patent
Sasaki

(10) Patent No.: US 11,137,817 B2
(45) Date of Patent: Oct. 5, 2021

(54) RECORDING MEDIUM, ARRANGEMENT SEARCH METHOD, AND ARRANGEMENT SEARCHING APPARATUS

(71) Applicant: FUJITSU LIMITED, Kawasaki (JP)

(72) Inventor: Tomotake Sasaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 137 days.

(21) Appl. No.: 16/140,001

(22) Filed: Sep. 24, 2018

(65) Prior Publication Data

US 2019/0025899 A1   Jan. 24, 2019

Related U.S. Application Data

(63) Continuation of application No. PCT/JP2016/060572, filed on Mar. 30, 2016.

(51) Int. Cl.
G06F 1/26 (2006.01)
G06F 1/32 (2019.01)
(Continued)

(52) U.S. Cl.
CPC .......... G06F 1/3234 (2013.01); G06F 1/206 (2013.01); G06F 1/26 (2013.01); G06F 1/3209 (2013.01);
(Continued)

(58) Field of Classification Search
CPC .................................. G06F 1/3234
See application file for complete search history.

(56) References Cited

U.S. PATENT DOCUMENTS 8,397,088 B1* 3/2013 Ghose ............... G06F 9/4893
713/300
2009/0259345 A1 10/2009 Kato et al.
(Continued)

FOREIGN PATENT DOCUMENTS

JP   6-337705      12/1994
JP   2006-207855    8/2006
(Continued)

OTHER PUBLICATIONS

Zhu et al., "Recursive Least Squares With Linear Constraints", Communications in Information and Systems, vol. 7, No. 3, pp. 287-312, 2007.
(Continued)

*Primary Examiner* — Mohammed H Rehman
(74) *Attorney, Agent, or Firm* — Staas & Halsey LLP

(57) ABSTRACT

A non-transitory, computer-readable recording medium stores therein an arrangement search program that causes a computer that searches arrangement of virtual machines in plural servers in a facility including the plural servers to execute a process that includes setting an initial value of a parameter concerning the arrangement of the plurality of virtual machines in the plurality of servers, based on at least any one of first performance information on power consumption of the plurality of servers, second performance information on power consumption of air conditioning equipment installed in the facility, third performance information on power consumption of power source equipment installed in the facility, and heat coupling information on heat coupling among the plurality of servers and among the plurality of servers and the air conditioning equipment; and updating the parameter by a sequential parameter estimation method, so as to optimize power consumption of the overall facility.

9 Claims, 12 Drawing Sheets

(51) Int. Cl.

| | | |
|---|---|---|
| *G06F 1/3234* | (2019.01) | |
| *G06F 9/50* | (2006.01) | |
| *G06F 9/46* | (2006.01) | |
| *G06F 1/20* | (2006.01) | |
| *G06F 1/3209* | (2019.01) | |
| *G06F 9/455* | (2018.01) | |
| *G06F 11/34* | (2006.01) | |

(52) U.S. Cl.
CPC ............ *G06F 9/45558* (2013.01); *G06F 9/46* (2013.01); *G06F 9/50* (2013.01); *G06F 11/3495* (2013.01); *G06F 2009/45591* (2013.01); *Y02D 10/00* (2018.01)

(56) References Cited

U.S. PATENT DOCUMENTS

| | | | |
|---|---|---|---|
| 2011/0113273 A1 | 5/2011 | Okitsu et al. | |
| 2011/0239215 A1* | 9/2011 | Sugai | G06F 9/45558 |
| | | | 718/1 |
| 2014/0208322 A1 | 7/2014 | Sasaki et al. | |
| 2014/0344812 A1* | 11/2014 | Abe | G06F 9/5094 |
| | | | 718/1 |
| 2015/0135176 A1* | 5/2015 | Kruglick | G06F 8/60 |
| | | | 718/1 |

FOREIGN PATENT DOCUMENTS

| | | |
|---|---|---|
| JP | 2009-252056 | 10/2009 |
| JP | 2011-39889 | 2/2011 |
| JP | 2013-58257 | 3/2013 |
| JP | 2013-87991 | 5/2013 |
| JP | 2013-196062 | 9/2013 |
| WO | WO 2010/032501 A1 | 3/2010 |
| WO | WO 2013/042615 A1 | 3/2013 |

OTHER PUBLICATIONS

Edgar, "Recursive Least Squares Parameter Estimation for Linear Steady State and Dynamic Models", Department of Chemical Engineering, University of Texas, Austin, TX 78712, pp. 1-19 [online]Internet Search Mar. 25, 2016, <https://cse.sc.edu/~gatzke/cache/edgar-recursive-estimation.pdf>.

International Search Report dated Jul. 5, 2016 in corresponding International Patent Application No. PCT/JP2016/060572.

Written Opinion of the International Searching Authority dated Jul. 5, 2016 in corresponding International Patent Application No. PCT/JP2016/060572.

* cited by examiner

| NUMBER OF RACKS | NUMBER OF SERVERS PER RACK | NUMBER OF PIECES OF AIR CONDITIONING EQUIPMENT |
|---|---|---|
| N | S | C |

| NUMBER | 1 | ... | S |
|---|---|---|---|
| 1 | $L_{1,1}$ | ... | $L_{1,S}$ |
| ... | ... | ... | ... |
| N | $L_{N,1}$ | ... | $L_{N,S}$ |

| NUMBER | 1 | ... | S |
|---|---|---|---|
| 1 | $W^0_{1,1}$ | ... | $W^0_{1,S}$ |
| ... | ... | ... | ... |
| N | $W^0_{N,1}$ | ... | $W^0_{N,S}$ |

| NUMBER OF VMs TO BE ADDITIONALLY ARRANGED |
|---|
| M |

FIG.8

| NUMBER | 1 | ... | M |
|---|---|---|---|
| VM SIZE | $T_1$ | | $T_M$ |

FIG.9

| NUMBER | 1 | 2 | ... | NS | NS+1 | NS+2 | ... | 2NS | 2NS+1 |
|---|---|---|---|---|---|---|---|---|---|
| VALUE | $\theta^w_{1,1}$ | $\theta^w_{1,2}$ | ... | $\theta^w_{N,S}$ | $\theta^v_{1,1}$ | $\theta^v_{1,2}$ | ... | $\theta^v_{N,S}$ | $\theta_b$ |

| NUMBER | 1 | ... | 2NS+1 |
|---|---|---|---|
| 1 | $P_{1,1}$ | ... | $P_{1,2NS+1}$ |
| ... | ... | ... | ... |
| 2NS+1 | $P^0_{2NS+1,1}$ | ... | $P_{2NS+1,2NS+1}$ |

| NUMBER | 1 | ... | S |
|---|---|---|---|
| 1 | $\alpha_{11}$ | ... | $\alpha_{1S}$ |
| : | : | ... | : |
| N | $\alpha_{N1}$ | ... | $\alpha_{NS}$ |

| NUMBER | 1 | ... | S |
|---|---|---|---|
| 1 | $\beta_{11}$ | ... | $\beta_{1S}$ |
| : | : | ... | : |
| N | $\beta_{N1}$ | ... | $\beta_{NS}$ |

| NUMBER | BASE POWER CONSUMPTION | PROPORTIONALITY COEFFICIENT |
|---|---|---|
| 1 | $\lambda_1$ | $\mu_1$ |
| : | : | : |
| C | $\lambda_C$ | $\mu_C$ |

| NUMBER | PROPORTIONALITY COEFFICIENT |
|---|---|
| 1 | $\kappa_1$ |
| : | : |
| C | $\kappa_C$ |

| NUMBER | BASE POWER CONSUMPTION | PROPORTIONALITY COEFFICIENT |
|---|---|---|
| 1 | $\eta_1$ | $\varepsilon_1$ |
| : | : | : |
| N | $\eta_N$ | $\varepsilon_N$ |

| NUMBER | 1 | ... | N |
|---|---|---|---|
| 1 | $\psi_{11}$ | ... | $\psi_{1N}$ |
| : | : | ... | : |
| C | $\psi_{C1}$ | ... | $\psi_{CN}$ |

| NUMBER | SUPPLIED HEAT FLOW |
|---|---|
| 1 | $q_{sup,1}$ |
| : | : |
| N | $q_{sup,N}$ |

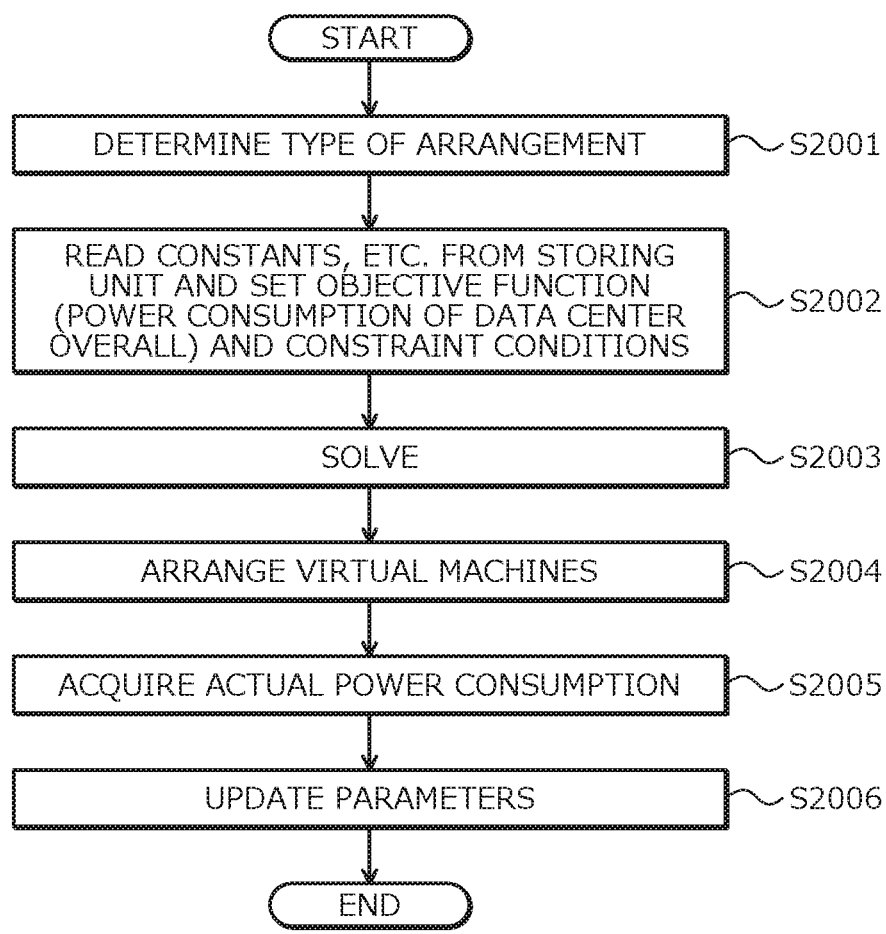

… (1)

RECORDING MEDIUM, ARRANGEMENT SEARCH METHOD, AND ARRANGEMENT SEARCHING APPARATUS

CROSS REFERENCE TO RELATED APPLICATIONS

This application is a continuation application of International Application PCT/JP2016/060572, filed on Mar. 30, 2016 and designating the U.S., the entire contents of which are incorporated herein by reference.

FIELD

The embodiments discussed herein relate to a recording medium, an arrangement search method, and an arrangement searching apparatus.

BACKGROUND

Facilitating optimization of electric power consumption has been recently desired for an data center overall when plural virtual machines (VMs) are assigned to plural servers installed in the data center, when plural virtual machines are migrated among the servers, or the like.

For example, according to a technique as a prior art, a mixed-integer programming problem that is described as a function of arrangement of virtual machines and that has, as an objective function, the total electric power consumption of the electric power consumption of the servers and the electric power consumption of power source equipment is solved and the virtual machines are arranged into the servers based on the solution of the mixed-integer programming problem. For example, according to another technique, the electric power consumption of a group of apparatuses, the electric power supply loss of electric power supply equipment, and the cooling electric power of cooling equipment are determined using arrangement information and workloads are assigned to the group of apparatuses such that the total of the electric power consumption, the electric power supply loss, and the cooling electric power is reduced. For example, according to another technique, assignment of workloads is determined to realize power-saving of an overall computer room using a power-saving property evaluation index that is based on an apparatus-related power consumption equation of an information processing apparatus. For example, according to yet another technique, the electric power consumption of each of operated freezing machines is determined for the above plural combinations, the total of the determined electric power consumptions is computed, and one of the combinations by which the value of the total becomes the minimum or one of the combinations by which the value of the total becomes lower than those of the other combinations is selected to be set (see, for example, International Publication No. WO 2013/042615, Japanese Laid-Open Patent Publication No. 2009-252056, International Publication No. WO 2010/032501, and Japanese Laid-Open Patent Publication No. 2006-207855).

SUMMARY

According to an aspect of an embodiment, a non-transitory, computer-readable recording medium stores therein an arrangement search program that causes a computer that searches arrangement of a plurality of virtual machines in a plurality of servers in a facility including the plurality of servers, to execute a process that includes setting an initial value of a parameter concerning the arrangement of the plurality of virtual machines in the plurality of servers, based on at least any one of first performance information on power consumption of the plurality of servers, second performance information on power consumption of air conditioning equipment installed in the facility, third performance information on power consumption of power source equipment installed in the facility, and heat coupling information on heat coupling among the plurality of servers and among the plurality of servers and the air conditioning equipment; and updating the parameter by a sequential parameter estimation method, so as to optimize power consumption of the overall facility.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of an example of storage content of largest size definition information 500;

FIG. 6 is an explanatory diagram of an example of storage content of arranged-size information 600;

FIG. 7 is an explanatory diagram of an example of storage content of additional arrangement number information 700;

FIG. 8 is an explanatory diagram of an example of storage content of virtual machine size information 800;

FIG. 9 is an explanatory diagram of an example of storage content of parameter information 900;

FIG. 10 is an explanatory diagram of an example of storage content of constant information 1000;

FIG. 11 is an explanatory diagram of an example of storage content of operation power consumption information 1100;

FIG. 12 is an explanatory diagram of an example of storage content of base power consumption information 1200;

FIG. 13 is an explanatory diagram of an example of storage content of CRAC unit information 1300;

FIG. 14 is an explanatory diagram of an example of storage content of chiller plant information 1400;

FIG. 15 is an explanatory diagram of an example of storage content of power source equipment information 1500;

FIG. 16 is an explanatory diagram of an example of storage content of heat flow relation information 1600;

FIG. 17 is an explanatory diagram of an example of storage content of supplied heat flow information 1700;

FIG. 20 is a flowchart of an example of a procedure for a process to arrange virtual machines.

DESCRIPTION OF THE INVENTION

First problems associated with the traditional techniques will be discussed. With the traditional techniques, it may be difficult to reduce the electric power consumption of the data center overall. For example, what values need to advantageously be set is unknown as the parameters to be used for a mixed-integer programming problem that has, as an objective function, the electric power consumption of the data center overall and therefore, it is difficult to optimize the electric power consumption of the data center overall.

Embodiments of a recording medium, an arrangement search method, and an arrangement searching apparatus according to the disclosure will be described in detail with reference to the accompanying drawings.

Figure 1:
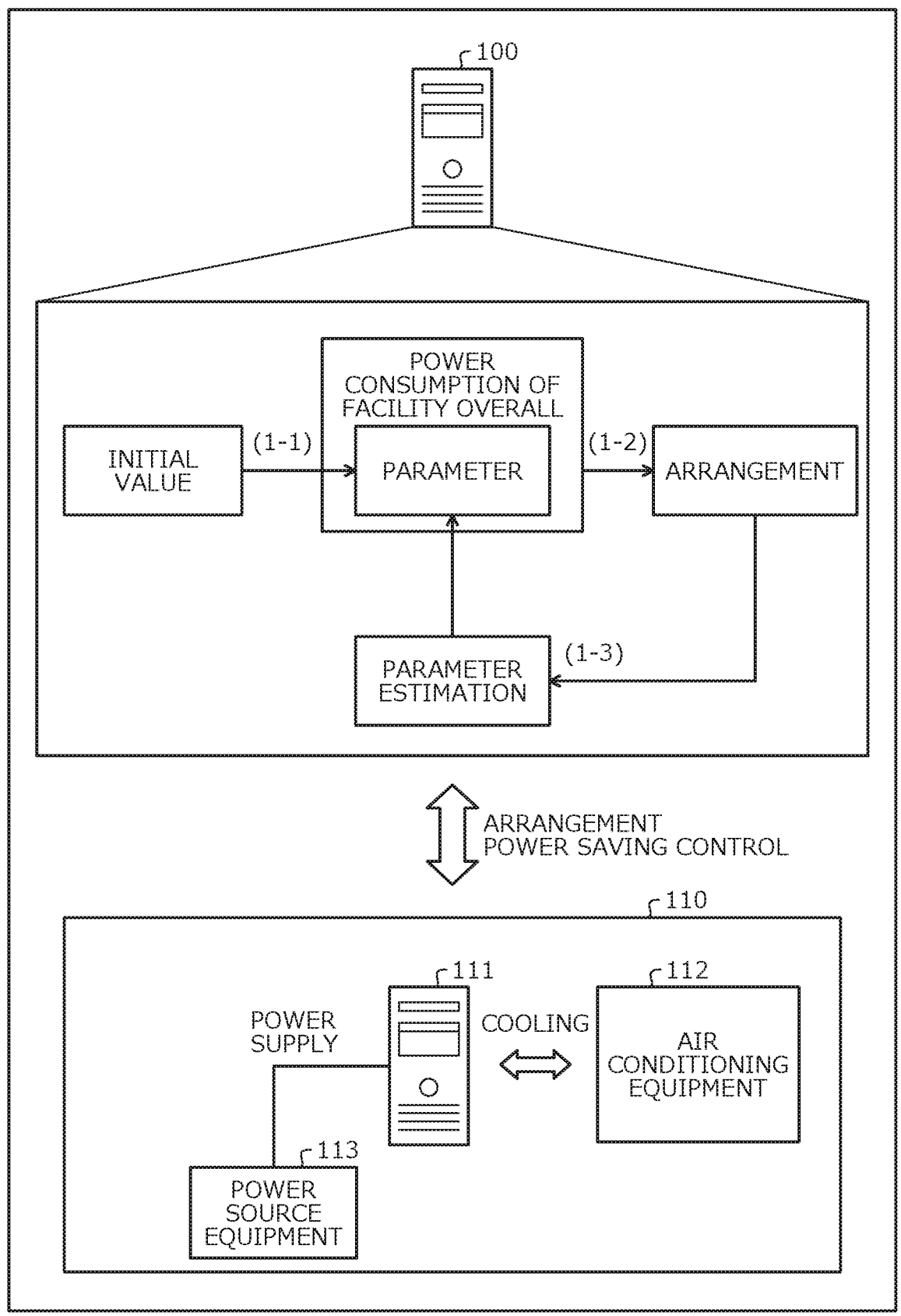
FIG. 1 is an explanatory diagram of an example of an arrangement search method according to an embodiment.

FIG. 1 is an explanatory diagram of an example of the arrangement search method according to the embodiment. An arrangement searching apparatus 100 is a computer to optimize the power consumption of a facility 110 overall. The facility 110 is, for example, a data center.

The facility 110 includes plural servers 111. The facility 110 further includes power source equipment 113 that supplies electric power to the plural servers 111, air conditioning equipment 112 that cools the plural servers 111, and the like. The "optimization" refers to, for example, minimization of the power consumption of the facility 110 overall under constraint conditions.

When plural virtual machines are assigned to the plural servers 111 installed in the data center, a tendency is present for the assignment reducing the power consumption of the data center overall to be desired. In contrast, (a) to (c) below may be considered while it may be difficult to reduce the power consumption of the data center overall.

(a) It can be considered that, for example, a mixed-integer programming problem that is described as a function of the arrangement of the virtual machines and that has, as an objective function, the total power consumption of the servers 111, the air conditioning equipment 112, and the power source equipment 113 is solved and the plural virtual machines are arranged into the plural servers 111 based on the solution of the mixed-integer programming problem.

What values are advantageously set is however unknown as the parameters to be used for the mixed-integer programming problem that has, as an objective function, the power consumption of the data center overall and it may therefore be difficult to reduce the power consumption of the data center overall. The parameters include, for example, coefficients indicating power consumption properties of the servers 111, the air conditioning equipment 112, the power source equipment 113, a coefficient indicating the heat transfer property of the inside of the data center, and the like.

For example, even when temperature sensors are installed at plural points in the data center, it is difficult to precisely analyze how the heat is transferred among the points at which the temperature sensors are installed, and it is therefore difficult to analyze the heat transfer property of the inside of the data center. As a result, what value is advantageously set as the coefficient that indicates the heat transfer property of the inside of the data center is unknown and it is therefore difficult to reduce the power consumption of the data center overall.

The value to be set advantageously as the parameter tends to vary over time. The value to be set advantageously as the parameter tends to vary due to aging degradation of the data center over time, or due to a change of the arrangement of the servers 111, the power source equipment 113, and the air conditioning equipment 112 in the data center. As a result, even when an advantageous value is set as the parameter to be used for the mixed-integer programming problem, the value becomes a disadvantageous value over time and it may therefore be difficult to reduce the power consumption of the data center overall.

(b) It can further be considered that the values are brought close to the advantageous values by updating the parameters used for the mixed-integer programming problem having, as an objective function, the power consumption of the data center overall every time the mixed-integer programming problem is solved, by applying a sequential parameter estimation method to (a). The sequential parameter estimation method is, for example, a recursive least-squares method. The sequential parameter estimation method is applicable to a case where the mixed-integer programming problem is repeatedly solved without any variation of the number of the parameters used for the mixed-integer programming problem.

The number of the variables and the number of the parameters used for the mixed-integer programming problem however tend to vary when the type and the number of the virtual machines to be arranged vary because the objective function of the mixed-integer programming problem is described as an explicit function for the arrangement of the virtual machines. As a result, the sequential parameter estimation method cannot be applied and the parameters used for the mixed-integer programming problem cannot be updated to be advantageous values. It may therefore be difficult to reduce the power consumption of the data center overall.

(c) It can therefore be considered that a mixed-integer programming problem is used that has, as an objective function, the total power consumption of the servers 111, the air conditioning equipment 112, and the power source equipment 113 described not as an explicit function for the arrangement of the virtual machines but as an explicit function of the total size of the virtual machines executed by the servers 111, and a presence or absence of energization of the servers 111. According to this, the number of the variables and the number of the parameters used for the mixed-integer programming problem do not vary even when the type and the number of the virtual machines to be arranged vary.

In contrast, it can be considered that the parameters are brought close to the advantageous values by updating the parameters used for the mixed-integer programming problem having, as an objective function, the power consumption of the data center overall every time the mixed-integer programming problem is solved, by applying the sequential parameter estimation method.

What values are advantageously set is however unknown as the initial values of the parameters used for the mixed-integer programming problem and therefore, the time period that is necessary for the parameters used for the mixed-integer programming problem to become close to the advantageous values may increase. During the time period for the parameters used for the mixed-integer programming problem to be close to the advantageous values, disadvantageous values as the parameters used for the mixed-integer programming problem are set and therefore, it may be difficult to reduce the power consumption of the data center overall.

In this embodiment, the arrangement search method will be described that facilitates the setting of advantageous values as the parameters used for the mixed-integer programming problem that has, as an objective function, the power consumption of the facility 110 overall and that concurrently optimizes the power consumption of the facility 110 overall when the mixed-integer programming problem is solved.

(1-1) The arrangement searching apparatus 100 uses initial values set into the plural servers 111, based on at least any one of first performance information, second performance information, third performance information, and heat coupling information as the initial values of the parameters concerning the arrangement of the plural virtual machines.

The "first performance information" refers to performance information concerning the power consumption of the plural servers 111. The first performance information is, for example, information that defines the power consumption for the unit size of the virtual machines executed by the servers 111, information that defines constant power consumption of the servers 111, and the like. The first performance information is, for example, operation power consumption information 1100 described later with reference to FIG. 11 and base power consumption information 1200 described later with reference to FIG. 12.

The "second performance information" refers to performance information concerning the power consumption of the air conditioning equipment 112 installed in the facility 110. The second performance information is, for example, information that defines the power consumption consumed by a computer room air conditioning unit for the heat flow flowing into the computer room air conditioning unit, information that defines constant power consumption of the computer room air conditioning unit, and the like. The second performance information is, for example, information that defines the power consumption consumed by the chiller plant for the heat flow flowing into the chiller plant. The second performance information is, for example, computer room air conditioning unit information 1300 described later with reference to FIG. 13 and chiller plant information 1400 described later with reference to FIG. 14.

The "third performance information" refers to performance information concerning the power consumption of the power source equipment 113 installed in the facility 110. The third performance information is, for example, information that defines the power consumption consumed by power source equipment 113 for the power consumption of the servers 111 and information that defines constant power consumption of the power source equipment 113. The third performance information is, for example, power source equipment information 1500 described later with reference to FIG. 15.

The "heat coupling information" refers to information on the heat coupling among the plural servers 111 and among the plural servers 111 and the air conditioning equipment 112. The heat coupling information is, for example, information that defines the heat flow relations among the servers 111 and the air conditioning equipment 112 and information that defines the supplied heat flows of the servers 111 and the air conditioning equipment 112. The heat coupling information is, for example, heat flow relation information 1600 described later with reference to FIG. 16 and supplied heat flow information 1700 described later with reference to FIG. 17.

The initial values of the parameters include, for example, the initial value concerning the power consumption of the facility 110 overall for the total size of the virtual machines executed by the servers 111, set based on the first performance information, the second performance information, the third performance information, and the heat coupling information. The initial value concerning the power consumption of the facility 110 overall for the total size of the virtual machines executed by the servers 111 is defined in accordance with, for example, equation (15) described later.

The initial values of the parameters include, for example, the initial value concerning the power consumption of the facility 110 overall with respect to a presence or absence of the energization of the servers 111, set based on the first performance information, the second performance information, the third performance information, and the heat coupling information. The initial value concerning the power consumption of the facility 110 overall with respect to a presence or absence of the energization of the servers 111 is defined in accordance with, for example, equation (16) described later.

The initial values of the parameters include, for example, the initial value concerning constant power consumption by the facility 110 overall, set based on the second performance information, the third performance information, and the heat coupling information. The initial value concerning constant power consumption by the facility 110 overall is defined in accordance with, for example, equation (17) described later.

(1-2) The arrangement searching apparatus 100 determines the arrangement of the plural virtual machines into the plural servers 111 using the parameters concerning the arrangement of the plural virtual machines into the plural servers 111 for the power consumption of the facility 110 overall to be optimized. The arrangement searching machine 100 controls the arrangement of the plural virtual machines into the plural servers 111 in accordance with the determined arrangement of the virtual machines.

For example, the arrangement searching apparatus 100 solves the mixed-integer programming problem having, as an objective function, the total power consumption of the power consumption of the servers 111, the power consumption of the air conditioning equipment 112, and the power consumption of the power source equipment 113, and determines the arrangement based on the solution of the mixed-integer programming problem. The mixed-integer programming problem having, as an objective function, the total power consumption is described as, for example, a function of the total size of the virtual machines executed by the plural servers 111, and a presence or absence of the energization of the servers 111, using the parameters concerning the arrangement of the plural virtual machines into the plural servers 111. The mixed-integer programming problem having, as an objective function, the total power consumption is defined in accordance with, for example, equation (1) and equations (5) to (10).

(1-3) The arrangement searching apparatus 100 updates the parameters concerning the arrangement of the plural virtual machines into the plural servers 111 to optimize the power consumption of the facility 110 overall, based on the sequential parameter estimation method. The sequential parameter estimation method is, for example, a recursive least-squares method, a recursive least-squares method using a forgetting factor, a recursive least-squares method using a rectangular window, or a Kalman filter.

For example, the arrangement searching apparatus 100 acquires from a power meter not depicted or the like, a measured value of the power consumption of the data center overall acquired after the arrangement of the plural virtual machines in the plural servers 111 is executed. The arrangement searching apparatus 100 updates the parameters concerning the arrangement of the plural virtual machines into the plural servers 111 using a calculated value of the power consumption of the data center overall determined based on the objective function and the measured value of the power consumption, based on the sequential parameter estimation method. The arrangement searching apparatus 100 updates the parameters concerning the arrangement of the plural virtual machines into the plural servers 111 in accordance with, for example, equations (19) and (20) described later.

The arrangement searching apparatus 100 may thereby update the parameters used for the mixed-integer programming problem starting from relatively advantageous values to be more advantageous values, based on the sequential parameter estimation method. The arrangement searching apparatus 100 may thereby facilitate reduction of the time period necessary for the parameters used for the mixed-integer programming problem to become close to the advantageous values.

As a result, the arrangement searching apparatus 100 may reduce the number of sessions that use relatively disadvantageous values as the parameters used for the mixed-integer programming problem, and may effectively reduce the power consumption of the data center overall. The arrangement searching apparatus 100 may use relatively advantageous values as the parameters used for the mixed-integer programming problem also during the time period for the parameters used for the mixed-integer programming problem to become close to the advantageous values, and may effectively reduce the power consumption of the data center overall.

The arrangement searching apparatus 100 may bring the parameters used for the mixed-integer programming problem to the advantageous values even when the values advantageously set as the parameters vary over time. The arrangement searching apparatus 100 may therefore effectively reduce the power consumption of the data center overall using the advantageous values as the parameters used for the mixed-integer programming problem. The arrangement searching apparatus 100 may suppress increases in the cost necessary for the maintenance and the management of the data center because no temperature sensors have to be disposed at plural points in the data center to set the parameters.

An example of an electronic computer system 200 to which the arrangement searching apparatus 100 depicted in FIG. 1 is applied will be described with reference to FIG. 2.

Figure 2:
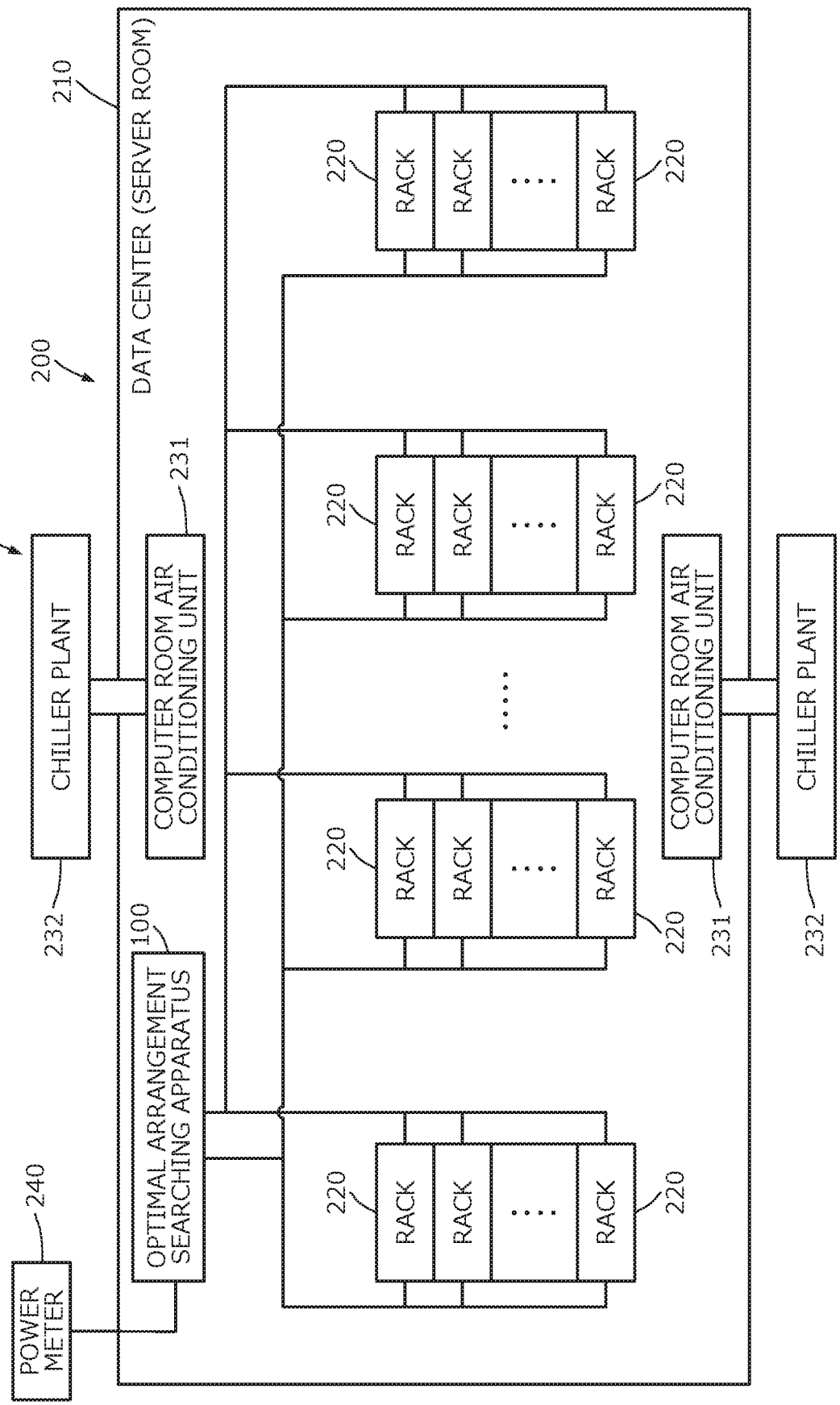
FIG. 2 is an explanatory diagram of an example of an electronic computer system 200.

FIG. 2 is an explanatory diagram of an example of the electronic computer system 200. The electronic computer system 200 is realized by, for example, a data center 210. In the electronic computer system 200 of FIG. 2, the data center 210 has N racks 220, C pieces of air conditioning equipment 112, the arrangement searching apparatus 100, and a power meter 240 installed therein. The racks 220 and the arrangement searching apparatus 100 may be connected to each other by, for example, a communication cable such as a local area network (LAN) cable or radio communication.

Each of the racks 220 accommodates the S servers 111 and an uninterruptible power supply (UPS) to be the power source equipment 113. The virtual machines are arranged in each of the servers 111. In the following description, each of the pieces of power source equipment 113 supplies electric power to the servers 111. For example, each of the pieces of power source equipment 113 supplies electric power to the plural servers 111 accommodated in the same rack 220, for each of the racks 220.

Each of the pieces of air conditioning equipment 112 includes a computer room air conditioning (CRAC) unit 231 and a chiller plant 232. The CRAC unit 231 cools the servers 111 in the rack 220. The chiller plant 232 is provided in a number equal to that of the CRAC units 231 and discharges air.

The power meter 240 measures the power consumption of the data center 210 overall and transmits the power consumption measurement to the arrangement searching apparatus 100. The arrangement searching apparatus 100 determines the arrangement of the plural virtual machines in the plural servers 111 using the parameters concerning the arrangement of the plural virtual machines in the plural servers 111 to optimize the power consumption of the data center 210 overall. The arrangement searching apparatus 100 uses the sequential parameter estimation method and updates the parameters concerning the arrangement of the plural virtual machines in the plural servers 111, based on the power consumption of the data center 210 overall, received from the power meter 240.

An example of the hardware configuration of the arrangement searching apparatus 100 will be described with reference to FIG. 3.

Figures 3, 4:
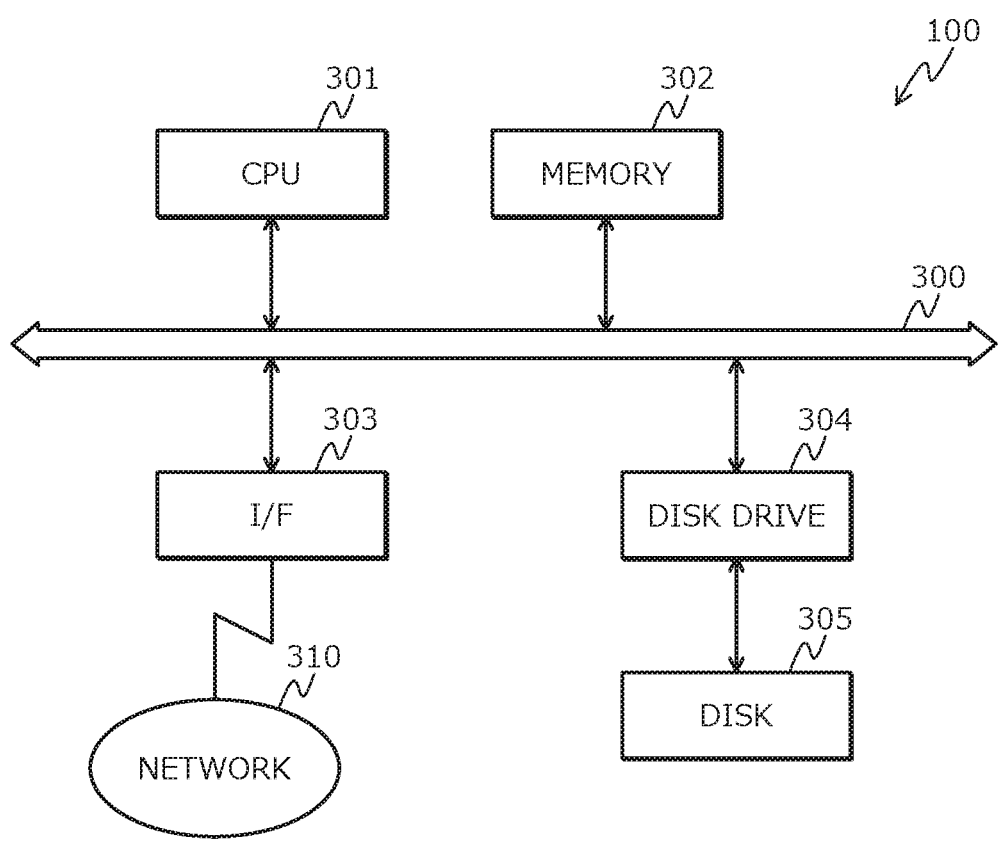
FIG. 3 is a block diagram of an example of a hardware configuration of an arrangement searching apparatus 100.
FIG. 4 is an explanatory diagram of an example of storage content of data center structure information 400.

FIG. 3 is a block diagram of an example of the hardware configuration of the arrangement searching apparatus 100. In FIG. 3, the arrangement searching apparatus 100 includes a central processing unit (CPU) 301, a memory 302, an interface (I/F) 303, a disk drive 304, and a disk 305. These components are connected to each other by a bus 300.

The CPU 301 supervises the control of the arrangement searching apparatus 100 overall. The CPU 301 solves the mixed-integer programming problem and arranges the virtual machines by executing an arrangement search program according to the embodiment. The CPU 301 updates the parameters used for the mixed-integer programming problem by executing the arrangement search program.

The memory 302 includes, for example, a read only memory (ROM), a random access memory (RAM), and a flash ROM. For example, the flash ROM or the ROM has various types of programs stored therein and the RAM is used as a work area for the CPU 301. The various types of programs include, for example, the arrangement search program according to the embodiment. The programs stored in the memory 302 are loaded onto the CPU 301, causing the CPU 301 to execute processes encoded in the programs.

The I/F 303 is connected to a network 310 through a communication line and is connected to the racks 220 and the like in the data center 210 through the network 310. The I/F 303 supervises an internal interface with the network 310, and controls the input and output of data from other computers such as the servers 111 in the racks 220. For example, a modem, a LAN adaptor, or the like may be employed as the I/F 303.

The disk drive 304, under the control of the CPU 301, controls the reading and writing of data with respect to the disk 305. The disk drive 304 is, for example, a magnetic disk drive. The disk 305 is a non-volatile memory that stores data therein written thereto under the control of the disk drive 304. The disk 305 is, for example, a magnetic disk or an optical disk.

In addition to the above components, the arrangement searching apparatus 100 may include, for example, a solid state drive (SSD), a semiconductor memory, a keyboard, a mouse, and a display. The arrangement searching apparatus 100 may include an SSD, a semiconductor memory, and the like instead of the disk drive 304 and the disk 305.

An example of the hardware configuration of the server 111 is similar to the example of the hardware configuration of the arrangement searching apparatus 100 depicted in FIG. 3 and will not be described.

An example of the various types of information stored in the arrangement searching apparatus 100 will be described. The arrangement searching apparatus 100 stores therein the various types of information that used for solving the mixed-integer programming problem, setting the initial values for the parameters of the mixed-integer programming problem, and updating the parameters of the mixed-integer programming problem based on the sequential parameter estimation method, as described later with reference to FIGS. 4 to 17. The various types of information described later with reference to FIGS. 4 to 17 are stored in, for example, the memory 302 of the arrangement searching apparatus 100.

An example of the storage content of data center structure information 400 will be described with reference to FIG. 4.

FIG. 4 is an explanatory diagram of an example of the storage content of the data center structure information 400. As depicted in FIG. 4, the data center structure information 400 is information that indicates the number of the racks 220, the number of the servers 110, and the number of the pieces of air conditioning equipment 112 of the data center 210. In the example of FIG. 4, the number of the racks 220 installed in the data center 210 is N. "N" is a positive integer. The number of the servers 111 per one rack 220 is S. "S" is a positive integer. The number of the pieces of air conditioning equipment 112 installed in the data center 210 is C. "C" is a positive integer. The data center structure information 400 is used, for example, when the mixed-integer programming problem is solved.

An example of the storage content of largest size definition information 500 will be described with reference to FIG. 5.

FIG. 5 is an explanatory diagram of an example of the storage content of the largest size definition information 500. As depicted in FIG. 5, the largest size definition information 500 is information that indicates the largest size of the virtual machine capable of being arranged into the j-th server 111 of the i-th rack 220. "i" is an integer from 1 to N. "j" is an integer from 1 to S. In the example of FIG. 5, the largest size of the virtual machine capable of being arranged into the j-th server 111 of the i-th rack 220 is $L_{ij}$. "$L_{ij}$" is, for example, the number of cores or the number of threads. The largest size definition information 500 is used, for example, for solving the mixed-integer programming problem.

An example of the storage content of arranged-size information 600 will be described with reference to FIG. 6.

FIG. 6 is an explanatory diagram of an example of the storage content of the arranged-size information 600. As depicted in FIG. 6, the arranged-size information 600 is information that indicates the total size of the virtual machines already arranged in the j-th server 111 of the i-th rack 220. In the example of FIG. 6, the total size of the virtual machines already arranged in the j-th server 111 of the i-th rack 220 is $w^0_{ij}$. "$w^0_{ij}$" is an integer from zero to $L_{ij}$. The arranged-size information 600 is used for, for example, solving the mixed-integer programming problem. The arranged-size information 600 is updated, for example, every time the virtual machines are additionally arranged into the servers.

An example of the storage content of additional arrangement number information 700 will be described with reference to FIG. 7.

FIG. 7 is an explanatory diagram of an example of the storage content of the additional arrangement number information 700. As depicted in FIG. 7, the additional arrangement number information 700 is information that defines the number of the virtual machines to be additionally arranged. In the example of FIG. 7, the number of the virtual machines to be additionally arranged is M. "M" is a positive integer. The additional arrangement number information 700 is used for, for example, solving the mixed-integer programming problem.

An example of the storage content of virtual machine size information 800 will be described with reference to FIG. 8.

Figure 8:
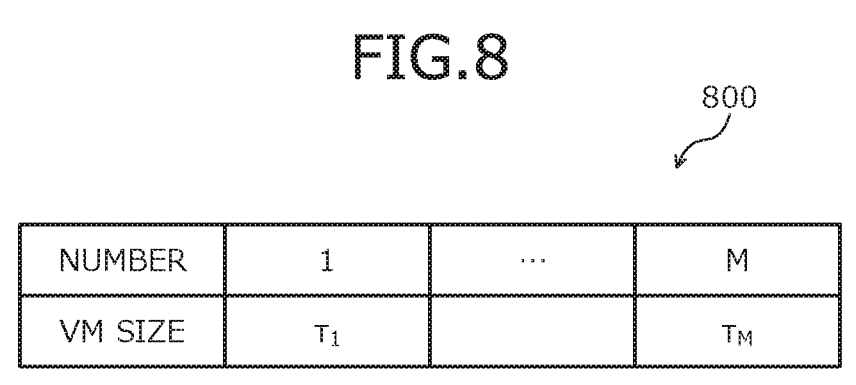

FIG. 8 is an explanatory diagram of an example of the storage content of the virtual machine size information 800. As depicted in FIG. 8, the virtual machine size information 800 is information that defines the size of the virtual machine to be additionally arranged. In the example of FIG. 8, when numbers 1 to M are given to the M virtual machines to be additionally arranged, the size of the n-th virtual machine is $\tau_n$. "n" is an integer from 1 to M. The virtual machine size information 800 is used for, for example, solving the mixed-integer programming problem.

An example of the storage content of parameter information 900 will be described with reference to FIG. 9.

FIG. 9 is an explanatory diagram of an example of the storage content of the parameter information 900. As depicted in FIG. 9, the parameter information 900 is information that defines 2NS+1 parameters that are used for the mixed-integer programming problem having, as an objective function, the power consumption of the data center 210 overall. In the example of FIG. 9, the parameters used for the mixed-integer programming problem having, as an objective function, the power consumption of the data center 210 overall are $\theta^w_{1,1}$ to $\theta^w_{N,S}$. The parameters used for the mixed-integer programming problem having, as an objective function, the power consumption of the data center 210 overall are $\theta^v_{1,1}$ to $\theta^v_{N,S}$. The parameter used for the mixed-integer programming problem having, as an objective function, the power consumption of the data center 210 overall is $\theta_b$. The parameter information 900 is used for, for example, solving the mixed-integer programming problem. The parameter information 900 is used for, for example, the updating based on the sequential parameter estimation method, and is updated based on the sequential parameter estimation method.

An example of the storage content of constant information 1000 will be described with reference to FIG. 10.

FIG. 10 is an explanatory diagram of an example of the storage content of the constant information 1000. As depicted in FIG. 10, the constant information 1000 is information that defines constants used for the sequential parameter estimation method. In the example of FIG. 10, the constants used for the sequential parameter estimation method are $P_{1,1}$ to $P_{2NS+1, 2NS+1}$. The constant information 1000 is used for, for example, the updating based on the sequential parameter estimation method, and is updated based on the sequential parameter estimation method.

An example of the storage content of operation power consumption information 1100 will be described with reference to FIG. 11.

FIG. 11 is an explanatory diagram of an example of the storage content of the operation power consumption information 1100. As depicted in FIG. 11, the operation power consumption information 1100 is information that defines the power consumption for a unit size of the virtual machines executed by the server 111. In the example of FIG. 11, the electric power consumed per unit size of the virtual machines executed by the j-th server 111 of the i-th rack 220 is $\alpha_{ij}$ Watts (W). "$\alpha_{ij}$" is a positive real number. The operation power consumption information 1100 is used for, for example, setting the initial values for the parameters of the mixed-integer programming problem.

An example of the storage content of base power consumption information 1200 will be described with reference to FIG. 12.

FIG. 12 is an explanatory diagram of an example of the storage content of base power consumption information 1200. As depicted in FIG. 12, the base power consumption information 1200 is information that defines base power consumption by the electronic computer system 200. In the example of FIG. 12, the electric power consumed by turning on the power source of the j-th server 111 of the i-th rack 220 is $\beta_{ij}$ W. "$\beta_{ij}$" is a positive real number. The base power consumption information 1200 is used for, for example, setting the initial values for the parameters of the mixed-integer programming problem.

An example of the storage content of CRAC unit information 1300 will be described with reference to FIG. 13.

FIG. 13 is an explanatory diagram of an example of the storage content of the CRAC unit information 1300. As depicted in FIG. 13, the CRAC unit information 1300 is information that defines the base power consumption and the proportionality coefficient of the CRAC unit 231. In the example of FIG. 13, the base power consumption of power constantly consumed by the k-th CRAC unit 231 is $\lambda_k$ W. "k" is an integer from 1 to C. "$\lambda_k$" is a positive real number. The proportionality coefficient that represents how many times as much electric power as entering heat flow by is consumed by the CRAC unit 231 relative to the heat flow flowing into the k-th CRAC unit 231 is $\mu_k$. "$\mu_k$" is a positive real number. The CRAC unit information 1300 is used for, for example, setting the initial values for the parameters of the mixed-integer programming problem.

An example of the storage content of chiller plant information 1400 will be described with reference to FIG. 14.

FIG. 14 is an explanatory diagram of an example of the storage content of the chiller plant information 1400. As depicted in FIG. 14, the chiller plant information 1400 is information that defines the proportionality coefficient of the chiller plant 232. In the example of FIG. 14, the proportionality coefficient that represents how many times as much electric power as entering heat flow by is consumed by the chiller plant 232 relative to the heat flow flowing into the k-th chiller plant 232 is $\kappa_k$. "$\kappa_k$" is a positive real number. When the chiller plant 232 constantly consumes electric power, similarly to the CRAC unit 231, the chiller plant information 1400 may also include the base power consumption of the chiller plant 232. The chiller plant information 1400 is used for, for example, setting the initial values for the parameters of the mixed-integer programming problem.

An example of the storage content of power source equipment information 1500 will be described with reference to FIG. 15.

FIG. 15 is an explanatory diagram of an example of the storage content of the power source equipment information 1500. As depicted in FIG. 15, the power source equipment information 1500 is information that defines the base power consumption and the proportionality coefficient of the power source equipment 113. In the example of FIG. 15, the base power consumption of power constantly consumed by the power source equipment 113 in the i-th rack is $\eta_i$ W. "$\eta_i$" is a positive real number. The proportionality coefficient that represents how many times as much electric power as the total power consumption is consumed by the power source equipment 113 relative to the total power consumption of the servers 111 in the i-th rack 220 is $\varepsilon_i$. "$\varepsilon_i$" is a positive real number. As an example, according to a catalog of ordinary power source equipment 113, $\varepsilon_i$ is about 0.01 to about 0.04.

The power source equipment information 1500 is used for, for example, setting the initial values for the parameters of the mixed-integer programming problem.

An example of the storage content of heat flow relation information 1600 will be described with reference to FIG. 16.

FIG. 16 is an explanatory diagram of an example of the storage content of the heat flow relation information 1600. As depicted in FIG. 16, the heat flow relation information 1600 is information that defines the heat flow relation among the racks 220 and the air conditioning equipment 112. In the example of FIG. 16, the proportionality coefficient that represents how many times as much heat flow as the heat flow discharged from the i-th rack 220 flows into the k-th CRAC unit 231 is $\varphi_{ki}$. "$\varphi_{ki}$" is a real number from 0 to 1. The heat flow relation information 1600 is used for, for example, setting the initial values for the parameters of the mixed-integer programming problem.

An example of the storage content of supplied heat flow information 1700 will be described with reference to FIG. 17.

FIG. 17 is an explanatory diagram of an example of the storage content of the supplied heat flow information 1700. As depicted in FIG. 17, the supplied heat flow information 1700 is information that defines the supplied heat flows of the rack 220 and the air conditioning equipment 112. In the example of FIG. 17, the heat flow supplied from the CRAC unit 231 to the i-th rack 220 is $q_{sup,i}$ W. "$q_{sup,i}$" is a real number. The supplied heat flow information 1700 is used for, for example, setting the initial values for the parameters of the mixed-integer programming problem.

An example of a functional configuration of the arrangement searching apparatus 100 will be described with reference to FIG. 18.

Figure 18:
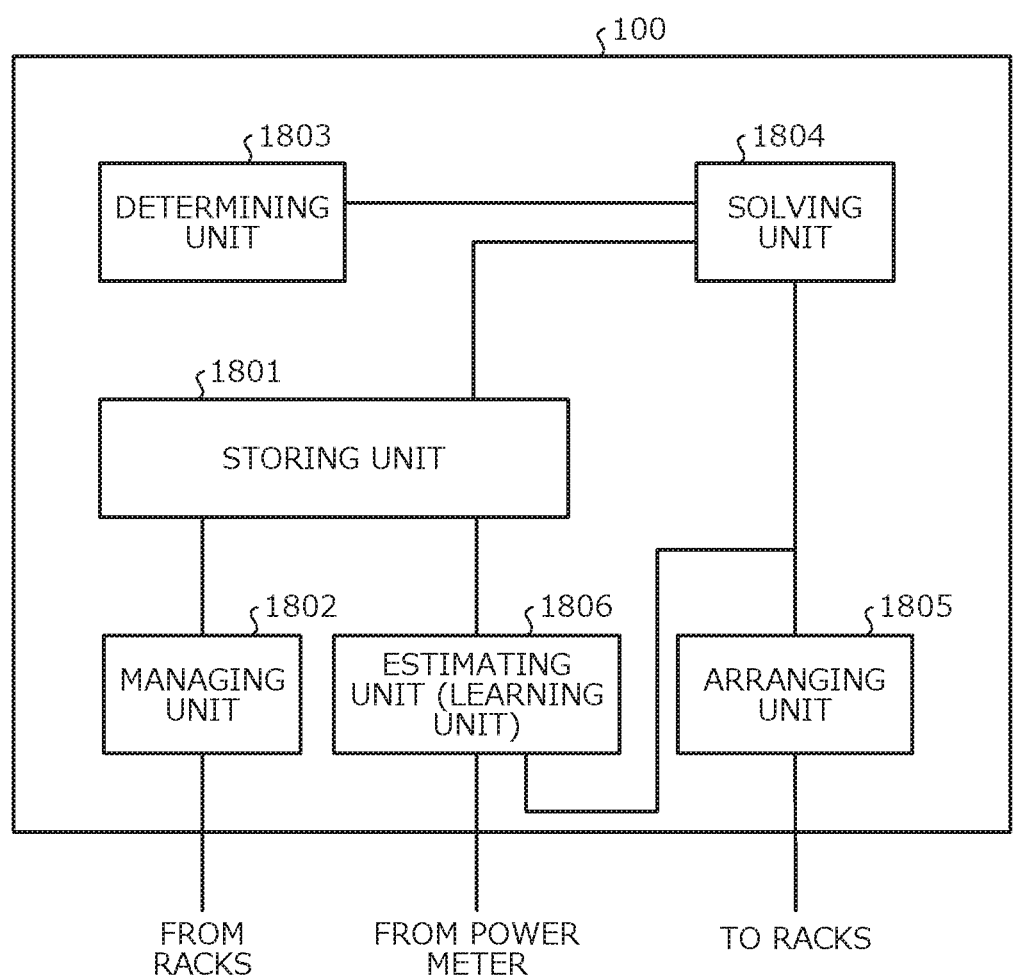
FIG. 18 is a block diagram of an example of a functional configuration of the arrangement searching apparatus 100.

FIG. 18 is a block diagram of an example of the functional configuration of the arrangement searching apparatus 100. The arrangement searching apparatus 100 includes a storing unit 1801, a managing unit 1802, a determining unit 1803, a solving unit 1804, an arranging unit 1805, and an estimating unit 1806.

The storing unit 1801 is realized by a storage area such as, for example, the memory 302 or the disk 305 depicted in FIG. 3. The components from the managing unit 1802 to the estimating unit 1806 are functions constituting a control unit and a function thereof is realized by causing the CPU 301 to execute a program stored in the storage area such as the memory 302 or the disk 305 depicted in FIG. 3, or by the I/F 303. The processing results of the functional units are stored to the storage area such as, for example, the memory 302 or the disk 305 depicted in FIG. 3.

The storing unit 1801 stores therein the constants, the variables, the objective function, and the constraint conditions. The storing unit 1801 inputs the constants, the variables, the objective function, and the constraint conditions into the solving unit 1804. The storing unit 1801 is, for example, the memory 302. The storing unit 1801, for example, stores therein the various types of information of FIGS. 4 to 17 and the like. The constants, the variables, the objective function, and the constraint conditions that do not dynamically vary may be described in the arrangement search program according to the embodiment.

The managing unit 1802 rewrites the arranged-size information 600 of FIG. 6 based on the information on the virtual machines arranged in the servers 111. For each of the servers 111, the arranged-size information 600 stores therein the total size of the virtual machines already arranged in the server 111. The arranged-size information may be stored in, for example, the storing unit 1801.

The determining unit 1803 determines which one of the mixed-integer programming problem that copes with the additional arrangement of the virtual machines, the mixed-integer programming problem that copes with the initial arrangement of the virtual machines, and the mixed-integer programming problem that copes with the rearrangement of the virtual machines is to be solved. Based on the determination result, the determining unit 1803 outputs to the solving unit 1804, an instruction as to which one of the mixed-integer programming problem that copes with the additional arrangement of the virtual machines, the mixed-integer programming problem that copes with the initial arrangement of the virtual machines, and the mixed-integer programming problem that copes with the rearrangement of the virtual machines is to be solved.

The solving unit 1804 solves the mixed-integer programming problem based on the constants, the variables, the objective function and the constraint conditions delivered from the storing unit 1801 and the instruction from the determining unit 1803. The mixed-integer programming problem is the mixed-integer programming problem described as a function of the computing resources required by the servers. The mixed-integer programming problem is described as a function of the total size of the virtual machines executed by the servers using, for example, the parameters concerning the arrangement of the virtual machines, and has, as an objective function, the total power consumption of the power consumption of the servers, the power consumption of the air conditioning equipment, and the power consumption of the power source equipment.

For example, the solving unit 1804 arranges the one or more virtual machine(s) in the one or more server(s) 111 in a state where all the servers 111 stop, by solving the mixed-integer programming problem that copes with the initial arrangement of the virtual machines. For example, the solving unit 1804 may further arrange the one or more virtual machine(s) additionally to those in the state where the one or more virtual machine(s) is/are already arranged in the one or more server(s) 111, by solving the mixed-integer programming problem that copes with the additional arrangement of the virtual machines.

For example, the solving unit 1804 may rearrange the virtual machines for the state in which the one or more virtual machine(s) is/are already arranged in the one or more server(s) 111, by solving the mixed-integer programming problem that copes with the rearrangement of the virtual machines. The solving unit 1804 may rearrange the virtual machines at regular time intervals. For example, the solving unit 1804 may rearrange the virtual machines based on live migration by solving the mixed-integer programming problem that copes with the rearrangement of the virtual machines and that takes into consideration the power consumption by the live migration.

For example, the solving unit 1804 makes a setting for the total size of the virtual machines already arranged in the servers 111 to be $w^0_{ij}$ and for the size of the n-th virtual machine additionally arranged to be $\tau_n$. The solving unit 1804 solves the mixed-integer programming problem that is defined in accordance with the objective function of equation (1) described later and the constraint conditions of equations (5) to (10) described later, using a solver and thereby, determines the solution of the mixed-integer programming problem that copes with the additional arrangement of the virtual machines. The solver is, for example, GLPK, SYMPHONY, or Gurobi Optimizer. The solving unit 1804 may thereby solve the mixed-integer programming problem that copes with the additional arrangement of the virtual machines.

For example, the solving unit 1804 may make a setting for the total size $w^0_{ij}$ of the virtual machines already arranged in the servers 111 to be 0 and for the size of the n-th virtual machine additionally arranged to be $\tau_n$. The solving unit 1804 solves the mixed-integer programming problem that is defined in accordance with the objective function of equation (1) described later and the constraint conditions of equations (5) to (10) described later, using the solver and thereby, determines the solution of the mixed-integer programming problem that copes with the initial arrangement of the virtual machines. The solving unit 1804 may thereby solve the mixed-integer programming problem that copes with the initial arrangement of the virtual machines.

For example, the solving unit 1804 may make a setting for the total size $w^0_{ij}$ of the virtual machines already arranged in the servers 111 to be 0 and for the virtual machines already arranged in the servers 111 to be the virtual machines to be additionally arranged. The solving unit 1804 solves the mixed-integer programming problem that is defined in accordance with the objective function of equation (1) described later and the constraint conditions of equations (5) to (10) described later, using the solver and thereby determines the solution of the mixed-integer programming problem that copes with the rearrangement of the virtual machines. The solving unit 1804 may thereby solve the mixed-integer programming problem that copes with the rearrangement of the virtual machines.

The arranging unit 1805 arranges the virtual machines into the servers 111 based on the solution of the mixed-integer programming problem derived by the solving unit 1804. For example, the arranging unit 1805 arranges the virtual machines into the servers 111 based on the total size $w_{ij}$ of the virtual machines executed by the servers 111 to be the solution of the mixed-integer programming problem.

The estimating unit 1806 sets the initial values of the parameters. The parameters, for example, are not the individual coefficients representing the properties of the server 111, the air conditioning equipment 112, the power source equipment 113, and the heat transfer but are each represented by a polynomial equation having coefficients combined with each other therein. The estimating unit 1806 sets the initial values of the parameters based on at least any one of the first performance information, the second performance information, the third performance information, and the heat coupling information. The first performance information is the performance information on the power consumption of the plural servers 111. The second performance information is the performance information on the power consumption of the air conditioning equipment 112 installed in the facility 110. The third performance information is the performance information on the power consumption of the power source equipment 113 installed in the facility 110.

The initial values of the parameters include the initial value that is related to the power consumption of the facility 110 overall for the total size of the virtual machines executed by the servers 111 and that is set based on at least any one of the first performance information, the second performance information, the third performance information, and the heat coupling information. The initial values of the parameters include, for example, the initial value defined in accordance with equation (15) described later.

For example, the estimating unit 1806 calculates the initial values of the parameters by substituting the constants indicated by the various types of information of FIGS. 11 and 13 to 16 into equation (15) described later, and sets the initial values of the parameters. In this case, when the estimating unit 1806 does not know a constant indicated by the information of any one of FIGS. 11 and 13 to 16, the estimating unit 1806 may calculate the initial values of the parameters by substituting a predetermined value used as a substitute of the constant in equation (15). The predetermined value used as the substitute of the constant is, for example, 1.

The initial values of the parameters include the initial value that is related to the power consumption of the facility 110 overall with respect to a presence or absence of energization of the servers 111 and that is set based on at least any one of the first performance information, the second performance information, the third performance information, and the heat coupling information. The initial values of the parameters include, for example, the initial value defined in accordance with equation (16) described later.

For example, the estimating unit 1806 calculates the initial values of the parameters by substituting the constants indicated by the various types of information of FIGS. 12 to 16, and sets the initial values of the parameters. In this case, when the estimating unit 1806 does not know a constant indicated by the information of any one of FIGS. 12 to 16, the estimating unit 1806 may calculate the initial values of the parameters by substituting a predetermined value used as a substitute of the constant, into equation (16) described later. The predetermined value used as the substitute of the constant is, for example, 1.

The initial values of the parameters include the initial value that is related to the constant power consumption by the facility 110 overall and that is set based on at least any one of the second performance information, the third performance information, and the heat coupling information. The initial values of the parameters include, for example, the initial value defined in accordance with equation (17) described later.

For example, the estimating unit 1806 calculates the initial values of the parameters by substituting the constants indicated by the various types of information of FIGS. 13 to 17, and sets the initial values of the parameters. In this case, when the estimating unit 1806 does not know a constant indicated by the information of any one of FIGS. 13 to 17, the estimating unit 1806 may calculate the initial values of the parameters by substituting a predetermined value used as a substitute of the constant, into equation. (17) described later. The predetermined value used as the substitute of the constant is, for example, 1.

The estimating unit 1806 updates the parameters using the sequential parameter estimation method to optimize the power consumption of the facility 110 overall. The sequential parameter estimation method is, for example, a recursive least-squares method, a recursive least-squares method using a forgetting factor, a recursive least-squares method using a rectangular window, or a Kalman filter. For example, the estimating unit 1806 updates the parameters to more precisely represent the amount of the influence on the power consumption of the facility 110 overall, using the sequential parameter estimation method.

For example, the estimating unit 1806 updates the parameters such that the calculated value of the power consumption of the facility 110 overall becomes close to the measured value of the power consumption of the facility 110 overall acquired after the virtual machines are arranged in the servers 111 by the arranging unit 1805. For example, the estimating unit 1806 solves an updating equation defined in accordance with equations (19) and (20) described later and thereby, updates the parameters.

Formulation of a mixed-integer programming problem coping with the situations of the data center 210 of (D-1) to (D-3) will be described. For example, the mixed-integer programming problem is defined such that, even when the type and the number of the virtual machines to be arranged vary, the number of the variables and the number of the parameters used for the mixed-integer programming problem do not vary.

(D-1) It is assumed that, as indicated by the data center structure information 400 of FIG. 4, the number of the racks 220 installed in the data center 210 is N, the number of the servers 111 per one rack 220 is S, and the number of the pieces of air conditioning equipment 112 installed in the data center 210 is C.

(D-2) It is assumed that, as indicated by the largest size definition information 500 of FIG. 5, the largest size of the virtual machines capable of being arranged in the j-th server 111 in the i-th rack 220 is $L_{ij}$. It is also assumed that, as indicated by the arranged-size information 600 of FIG. 6, the total size of the virtual machines already arranged in the j-th server 111 in the i-th rack 220 is $w^o_{ij}$.

(D-3) It is assumed that, as indicated by the additional arrangement number information 700 of FIG. 7, the number of the virtual machines to be additionally arranged is M. It is also assumed that, as indicated by the virtual machine size information 800 of FIG. 8, when numbers 1 to M are given to the M virtual machines to be additionally arranged, the size of the n-th virtual machine is $\tau_n$.

In the cases of (D-1) to (D-3), the mixed-integer programming problem is defined in accordance with, for example, a minimization function to be the objective function of equation (1) below and the constraint conditions of equations (5) to (10) below. Equation (1) below represents the inner product of a row vector and a column vector. Equation (1) is defined to represent the power consumption of the data center 210 overall, and is the target of the minimization under the constraint conditions.

$$\text{Minimize } \theta^T \begin{bmatrix} w \\ v \\ 1 \end{bmatrix} \quad (1)$$

In equation (1), w is defined in accordance with equation (2) below. For example, w is a vector having the total size $w_{ij}$ of the virtual machines executed by the j-th server 111 in the i-th rack 220, arranged therein as an element. The number of elements of w is not the type and the number of the virtual machines to be arranged but corresponds to the number of the servers 111, and is N×S. The number of the elements of w therefore does not vary even when the type and the number of the virtual machines to be arranged vary.

$$w = \begin{bmatrix} w_{1,1} \\ w_{1,2} \\ \vdots \\ w_{N,S} \end{bmatrix} \quad (2)$$

In equation (1), v is defined in accordance with equation (3) below. For example, v is a vector that has $v_{ij}$ arranged therein as an element and that represents whether the power source of the j-th server 111 in the i-th rack 220 is turned on.

When the value of $v_{ij}$ is 0, this indicates that the server 111 is not energized and the power source of the server 111 is turned off. When the value of $v_{ij}$ is 1, this indicates that the server 111 is energized and the power source of the server 111 is turned on. The number of the elements of v corresponds not to the type and the number of the virtual machines to be arranged but to the number of the servers 111, and is N×S. The number of the elements of v does not vary even when the type and the number of the virtual machines to be arranged vary.

$$v = \begin{bmatrix} v_{1,1} \\ v_{1,2} \\ \vdots \\ v_{N,S} \end{bmatrix} \quad (3)$$

In equation (1), $\theta^T$ is defined in accordance with equation (4) below. For example, $\theta^T$ is a vector that has arranged therein as an elements, parameters $\theta^w_{1,1}$ to $\theta^w_{N,S}$ to be the coefficients for the elements of w, that has arranged therein as an elements, parameters $\theta^v_{1,1}$ to $\theta^v_{N,S}$ to be the coefficients for the elements of v, and that has arranged therein as an element, $\theta_b$ to be the coefficient for a constant 1.

$$\theta^T = [\theta^w_{1,1} \theta^w_{1,2} \ldots \theta^w_{N,S} \theta^v_{1,1} \theta^v_{1,2} \ldots \theta^v_{N,S} \theta_b] \quad (4)$$

The power consumption of the data center 210 overall for the total size of the virtual machines executed by the servers 111 is represented by w in equation (1) and $\theta^w_{1,1}$ to $\theta^w_{N,S}$ in equation (4). Therefore, values more precisely representing the amount of influence on the power consumption of the data center 210 overall per unit size of the virtual machines executed by the servers 111 may be set as $\theta^w_{1,1}$ to $\theta^w_{N,S}$.

The power consumption of the data center 210 overall for the presence or the absence of the energization of the servers 111 is represented by v in equation (1) and $\theta^v_{1,1}$ to $\theta^v_{N,S}$ in equation (4). Therefore, values more precisely representing the amount of influence on the power consumption of the data center 210 overall based on the presence or the absence of the energization of the servers 111 may be set as $\theta^v_{1,1}$ to $\theta^v_{N,S}$.

The constantly consumed power consumption of the power consumption of the data center 210 overall is a constant not concerning w and v and is represented by the constant 1 in equation (1) and $\theta_b$ in equation (4). Therefore a value more precisely representing the power consumption of power constantly consumed by the data center 210 overall may be set as $\theta_b$.

Thus, the objective function may be defined, whereby the number of the parameters does not vary regardless of the type and the number of the virtual machines to be arranged and whereby, when the advantageous values are set as the parameters, the power consumption of the data center 210 overall may precisely be represented. In addition, the constraint conditions are defined in accordance with equations (5) to (10) below, for the objective function.

Equation (5) below represents a constraint condition representing that $x_{n,i,j}$ is a discrete variable that takes any one value of "0" and "1". $x_{n,i,j}$ represents whether the n-th virtual machine is assigned to the j-th server 111 in the i-th rack 220. $x_{n,i,j}$ takes 1 when the n-th virtual machine is executed by the j-th server 111 in the i-th rack 220, and takes 0 when the n-th virtual machine is not executed. In other words, equation (5) below may represent the arrangement of the virtual machines. $x_{n,i,j}$ is prevented from taking a value other than "0, 1" by equation (5) below.

$$x_{n,i,j} \in \{0,1\}, n=1, \ldots, M, i=1, \ldots, N, j=1, \ldots, S \quad (5)$$

Equation (6) below represents a constraint condition representing that the above $v_{i,j}$ is a discrete variable taking any one value of "0" and "1". $v_{i,j}$ takes 1 when the j-th server 111 in the i-th rack 220 is energized and the power source thereof is turned on, and takes 0 when the j-th server 111 is not energized and the power source thereof is turned off. In other words, equation (6) below may represent whether the power source of the server 111 is turned on. The variable $v_{i,j}$ is prevented from taking a value other than "0, 1" using (6) below.

$$v_{i,j} \in \{0,1\}, i=1, \ldots, N, j=1, \ldots, S \quad (6)$$

Equation (7) below represents a constraint condition representing that the sum of $x_{n,i,j}$ concerning the servers 111 is "1". Taking equation (5) into consideration, the variable concerning any one server 111 of the servers 111 therefore takes "1" and the variables $x_{n,i,j}$ concerning the rest of the servers 111 each takes "0". In other words, equation (7) below may represent that the n-th virtual machine is assigned to any one server 111, and may represent that no case is present where the n-th virtual machine is assigned to the two or more servers 111 and where the n-th virtual machine is not assigned to any server 111.

$$\sum_{i=1}^{N} \sum_{j=1}^{S} x_{n,i,j} = 1, n = 1, \ldots, M \quad (7)$$

Equation (8) below represents a constraint condition representing that the total size $w_{ij}$ of the virtual machines executed by the j-th server 111 in the i-th rack 220 is the sum of the total size $w^0_{ij}$ of the already arranged virtual machines and the size $\tau_n$ of the additionally arranged virtual machine. In other words, equation (8) below may represent the total size $w_{ij}$ of the virtual machines to be executed by the j-th server 111 in the i-th rack 220 after the virtual machine is additionally arranged.

$$w_{i,j} = w^0_{i,j} + \sum_{n=1}^{M} \tau_n x_{n,i,j}, i = 1, \ldots, N, j = 1, \ldots, S \quad (8)$$

Equation (9) below represents a constraint condition representing that the total size $w_{ij}$ of the virtual machines executed by the j-th server 111 in the i-th rack 220 is equal to or smaller than the largest size $L_{ij}$ of the virtual machines capable of being arranged in the j-th server 111 in the i-th rack 220. In other words, equation (9) below may represent that no virtual machine is added to the server 111 that cannot execute a virtual machine additionally arranged therein.

$$w_{i,j} \leq L_{i,j}, i=1, \ldots, N, j=1, \ldots, S \quad (9)$$

Equation (10) below represents a constraint condition representing that, when the power source of the j-th server 111 in the i-th rack 220 is turned on, one or more virtual machine(s) is/are arranged into the j-th server 111 in the i-th rack 220. Equation (10) below is also a constraint condition representing that, when no virtual machine is arranged into the j-th server 111 in the i-th rack 220, the power source of the j-th server 111 in the i-th rack 220 is turned off.

$$v_{i,j} \leq \sum_{n} x_{n,i,j} \leq L_{i,j} v_{i,j}, i = 1, \ldots, N, j = 1, \ldots, S \quad (10)$$

As described, it is desired that the values advantageous from the viewpoint of facilitating reduction of the power consumption of the data center 210 overall are set as the parameters $\theta^w_{1,1}$ to $\theta^w_{N,S}$, $\theta^v_{1,1}$ to $\theta^v_{N,S}$, and $\theta_b$ used for the objective function of the mixed-integer programming problem. The parameters $\theta^w_{1,1}$ to $\theta^w_{N,S}$, $\theta^v_{1,1}$ to $\theta^v_{N,S}$, and $\theta_b$ are therefore updated for their values to become close to their advantageous values every time the mixed-integer programming problem is solved using the sequential parameter estimation method. In this case, the sequential parameter estimation method has natures such as (M-1) and (M-2) below.

(M-1) The initial values of the parameters $\theta^w_{1,1}$ to $\theta^w_{N,S}$, $\theta^v_{1,1}$ to $\theta^v_{N,S}$, and $\theta_b$ may relatively be close to the values advantageous from the viewpoint of facilitating reduction of the power consumption of the data center 210 overall. In this case, the time period or the processing amount that is necessary for the parameters $\theta^w_{1,1}$ to $\theta^w_{N,S}$, $\theta^v_{1,1}$ to $\theta^v_{N,S}$, and $\theta_b$ to become close to the values advantageous from the viewpoint of facilitating reduction of the power consumption of the data center 210 overall, tends to be reduced.

(M-2) The initial values of the parameters $\theta^w_{1,1}$ to $\theta^w_{N,S}$, $\theta^v_{1,1}$ to $\theta^v_{N,S}$, and $\theta_b$ may be relatively distant from the values advantageous from the viewpoint of facilitating reduction of the power consumption of the data center 210 overall. In this case, the time period or the processing amount that is necessary for the parameters $\theta^w_{1,1}$ to $\theta^w_{N,S}$, $\theta^v_{1,1}$ to $\theta^v_{N,S}$, and $\theta_b$ to become close to the values advantageous from the viewpoint of facilitating reduction of the power consumption of the data center 210 overall, tends to be increased. In this case, as a result, it is difficult to reduce the power consumption of the data center 210 overall until the parameters $\theta^w_{1,1}$ to $\theta^w_{N,S}$, $\theta^v_{1,1}$ to $\theta^v_{N,S}$, and $\theta_b$ are brought close to the values advantageous from the viewpoint of facilitating reduction of the power consumption of the data center 210 overall.

Therefore, for the initial values of the parameters $\theta^w_{1,1}$ to $\theta^w_{N,S}$, $\theta^v_{1,1}$ to $\theta^v_{N,S}$, and $\theta_b$, values may be used that are relatively close to the values advantageous from the viewpoint of facilitating reduction of the power consumption of the data center 210 overall. The power consumption of the data center 210 overall will be described, and the initial values of the parameters $\theta^w_{1,1}$ to $\theta^w_{N,S}$, $\theta^v_{1,1}$ to $\theta^v_{N,S}$, and $\theta_b$ that are relatively close to the values advantageous from the viewpoint of reducing the power consumption of the data center 210 overall, will be described.

To describe the power consumption of the data center 210 overall, the natures concerning the power consumption and retained by the servers 111 installed in the data center 210, the CRAC unit 231 and the chiller plant 232 to be the air conditioning equipment 112, and the power source equipment 113, will be described. For example, the server 111 retains the natures as in (S-1) to (S-3) below concerning the power consumption.

(S-1) The power source of the server 111 is turned on when even only one virtual machine is executed by the server 111, and the power source of the server 111 is turned off when no virtual machine is executed by the server 111.

(S-2) When the power source of the server 111 is turned on, a specific amount of electric power is consumed by the server 111.

(S-3) The load is increased when the total size of the virtual machines executed by the servers 111 is increased, and the power consumption is increased corresponding to the total size of the executed virtual machines.

For example, the power source equipment 113 retains the natures as in (U-1) and (U-2) below concerning the power consumption.

(U-1) Regardless of the operation state of the servers 111 in the rack 220, a specific amount of electric power is constantly consumed by the power source equipment 113 in the rack 220.

(U-2) When the total power consumption of the servers 111 in the rack 220 is increased, the power consumption of the power source equipment 113 in the rack 220 is increased corresponding to the total power consumption of the servers 111 in the rack 220.

For example, the CRAC unit 231 retains natures as in (C-1) and (C-2) below concerning the power consumption.

(C-1) A specific amount of electric power is constantly consumed by the CRAC unit 231.

(C-2) When the heat flow flowing into the k-th CRAC unit 231 increases, the power consumption by the k-th CRAC unit 231 is increased.

For example, the chiller plant 232 retains natures as in (C-3) and (C-4) concerning the power consumption.

(C-3) The heat flow flowing into the k-th chiller plant 232 is equal to the heat flow discharged from the k-th CRAC unit 231.

(C-4) When the heat flow discharged from the k-th chiller plant 232 increases, the power consumption of the k-th chiller plant 232 increases.

The servers 111, the CRAC unit 231 and the chiller plant 232 to be the air conditioning equipment 112, and the power source equipment 113 that are installed in the data center 210 have the natures concerning the power consumption as above. The power consumption of the data center 210 overall is therefore defined in accordance with equation (11) below.

$$\sum_{i=1}^{N}\left[\eta_i + (1+\varepsilon_i)\left\{\sum_{j=1}^{S}\beta_{ij}v_{ij} + \alpha_{ij}\left(w_{ij}^0 + \sum_{n=1}^{M}\tau_n x_{n,i,j}\right)\right\}\right] + \sum_{k=1}^{C}(\lambda_k + \mu_k q_{in,CRAC,k}) + \sum_{k=1}^{C}(\kappa_k q_{out,CRAC,k}) \quad (11)$$

Equation (11) is an equation that represents the power consumption of the data center 210 overall using the constants indicated by the various types of information of FIGS. 11 to 17 based on the natures retained by the servers 111, the CRAC units 231, the chiller plants 232, and the power source equipment 113 that are installed in the data center 210. The description for the constants indicated by the various types of information of FIGS. 11 to 17 is similar to that described with reference to FIGS. 11 to 17 and will not be described hereinafter. The heat coupling in the data center 210 has natures of (Q-1) to (Q-3).

(Q-1) The heat flow discharged from each of the CRAC units 231 is acquired by adding the heat flow generated by each of the CRAC units 231 (that is, the power consumption thereof) to the heat flow flowing into the CRAC unit 231. The nature of (Q-1) is defined in accordance with, for example, equation (12) below.

$$q_{out,CRAC,k} = q_{in,CRAC,k} + \lambda_k + \mu_k q_{in,CRAC,k}, k=1,\ldots,C \quad (12)$$

(Q-2) The heat flow flowing into each of the CRAC units 231 is the heat flow discharged from each of the racks 220. The nature of (Q-2) is defined in accordance with, for example, equation (13) below.

$$q_{in,CRAC,k} = \sum_{i=1}^{N} \psi_{ki} q_{out,RACK,i}, \, k=1, \ldots, C \quad (13)$$

(Q-3) The heat flow discharged from each of the racks 220 is acquired by adding the heat flow generated by the rack 220 (that is, the power consumption thereof) to the heat flow flowing into each of the racks 220. The nature of (Q-3) is defined in accordance with, for example, equation (14).

$$q_{out,RACK,i} = q_{sup,i} + \eta_i + (1+\varepsilon_i)\left(\sum_{j=1}^{S}\beta_{ij}v_{ij} + \alpha_{ij}\left(w_{ij}^0 + \sum_{n=1}^{M}\tau_n x_{n,i,j}\right)\right), \quad (14)$$

$$i = 1, \ldots, N$$

The power consumption of the data center 210 overall defined in accordance with equation (11) described above is compared to the power consumption of the data center 210 overall defined in accordance with equation (1) with reference to equations (12) to (14). The initial values of the parameters $\theta^w_{1,1}$ to $\theta^w_{N,S}$, $\theta^v_{1,1}$ to $\theta^v_{N,S}$, and $\theta_b$ of equation (1) are defined in accordance with equations (15) to (17) below.

$$\theta^w_{i,j} = (1+\varepsilon_i)\left\{1+\sum_{k=1}^{C}\psi_{k,i}(\mu_k + \kappa_k + \mu_k \kappa_k)\right\}\alpha_{i,j}, i=1,\ldots,N, \quad (15)$$
$$j = 1, \ldots, S$$

$$\theta^v_{i,j} = (1+\varepsilon_i)\left\{1+\sum_{k=1}^{C}\psi_{k,i}(\mu_k + \kappa_k + \mu_k \kappa_k)\right\}\beta_{i,j}, i=1,\ldots,N, \quad (16)$$
$$j = 1, \ldots, S$$

$$\theta_b = \sum_{i=1}^{N}\eta_i + \sum_{k=1}^{C}(\lambda_k + \kappa_k\lambda_k) + \sum_{i=1}^{N}\sum_{k=1}^{C}\psi_{k,i}(\mu_k + \kappa_k + \mu_k \kappa_k)(q_{sup,i} + \eta_i) \quad (17)$$

Thus, the parameters used for the mixed-integer programming problem may be started with the relatively advantageous initial values. The arrangement searching apparatus 100 may thereby reduce the power consumption of the data center 210 overall using the relatively advantageous values as the parameters used for the mixed-integer programming problem even during the time period during which the parameters used for the mixed-integer programming problem are brought close to the advantageous values.

The arrangement searching apparatus 100 thereafter determines the solution that minimizes the objective function of equation (1), using the initial values of the parameters $\theta^w_{1,1}$ to $\theta^w_{N,S}$, $\theta^v_{1,1}$ to $\theta^v_{N,S}$, and $\theta_b$ of equations (15) to (17) to satisfy the constraint conditions of equations (5) to (10). The solution minimizing the objective function of equation (1) is defined in accordance with, for example, equation (18) below.

$$\xi_* = \begin{bmatrix} w_* \\ v_* \\ 1 \end{bmatrix} \quad (18)$$

The arrangement searching apparatus 100 arranges the plural virtual machines in the plural servers 111 based on the determined solution. Meanwhile, the power meter 240 measures the power consumption of the data center 210 overall in a state where the plural virtual machines are arranged in the plural servers 111 based on the solution of the mixed-integer programming problem, and transmits the measured power consumption of the data center 210 overall to the arrangement searching apparatus 100. In the following description, the measured power consumption of the data center 210 overall may be written as "actual power consumption".

As described, it is desired to set the values advantageous from the viewpoint of facilitating reduction of the power consumption of the data center 210 overall as the parameters $\theta^w_{1,1}$ to $\theta^w_{N,S}$, $\theta^v_{1,1}$ to $\theta^v_{N,S}$, and $\theta_b$ used for the objective function of the mixed-integer programming problem. The arrangement searching apparatus 100 therefore updates the parameters $\theta^w_{1,1}$ to $\theta^w_{N,S}$, $\theta^v_{1,1}$ to $\theta^v_{N,S}$, and $\theta_b$ using the sequential parameter estimation method.

For example, the recursive least-squares method is defined in accordance with equations (19) and (20). "p" represents the actual power consumption of the data center 210 overall. "$\theta^T\xi_*$" represents the calculated power consumption of the data center 210 overall. The parameters are therefore updated based on equations (19) and (20) below such that the calculated power consumption of the data center 210 overall becomes close to the actual power consumption of the data center 210 overall.

$$\theta^T \leftarrow \theta^T + \frac{\xi_*^T P}{1+\xi_*^T P \xi_*}(p - \theta^T \xi_*) \quad (19)$$

$$P \leftarrow P - \frac{P\xi_*\xi_*^T P}{1+\xi_*^T P \xi_*} \quad (20)$$

When the parameters $\theta^w_{1,1}$ to $\theta^w_{N,S}$, $\theta^v_{1,1}$ to $\theta^v_{N,S}$, and $\theta_b$ are updated for the first time, the initial value of P in equation (20) is defined in accordance with, for example, equation (21). $I_{2NS}$ is the unit matrix whose size is 2NS+1. γ is a relatively large positive value. When the parameters $\theta^w_{1,1}$ to $\theta^w_{N,S}$, $\theta^v_{1,1}$ to $\theta^v_{N,S}$, and $\theta_b$ are updated for the second time and thereafter, an updated value is used also for P.

$$P = \gamma I_{2NS+1} \quad (21)$$

The arrangement searching apparatus 100 may thereby update the parameters used for the mixed-integer programming problem to more advantageous values using the sequential parameter estimation method. As a result, the arrangement searching apparatus 100 may determine the solution that minimizes the objective function of equation (1) using the parameters $\theta^w_{1,1}$ to $\theta^w_{N,S}$, $\theta^v_{1,1}$ to $\theta^v_{N,S}$, and $\theta_b$ that are updated to the more advantageous values. The arrangement searching apparatus 100 may effectively reduce the power consumption of the data center 210 overall.

For example, the arrangement searching apparatus 100 defines the objective function of equation (1) and the constraint conditions of equations (5) to (10) as the mixed-integer programming problem having, as an objective function, the power consumption of the data center overall. The arrangement searching apparatus 100 may sequentially use more advantageous values as the parameters used in the objective function of equation (1). The arrangement searching apparatus 100 may use the coefficients whose accurate values are known in advance, as the coefficients used in the constraint conditions of equations (5) to (10).

Thus, the arrangement searching apparatus 100 may define the mixed-integer programming problem that uses the more advantageous parameters and the accurate coefficients, and may cause the objective function of the mixed-integer programming problem to more accurately represent the power consumption of the data center 210 overall. As a result, the arrangement searching apparatus 100 may effectively reduce the power consumption of the data center 210 overall by solving the mixed-integer programming problem.

For example, a case may be considered where to facilitate reduction of the power consumption, a mixed-integer programming problem is formulated that has $\alpha_{ij}$, $\beta_{ij}$, $\lambda_k$, $\mu_k$, $\kappa_k$, $\eta_i$, $\varepsilon_i$, $\varphi_{ki}$, $q_{sup,i}$, and the like as parameters and that has the power consumption of the data center 210 overall as an objective function. In this case, however, any effective reduction of the power consumption tends to be difficult for the data center 210 overall because it is difficult to precisely determine $\alpha_{ij}$, $\beta_{ij}$, $\lambda_k$, $\mu_k$, $\kappa_k$, $\eta_i$, $\varepsilon_i$, $\varphi_{ki}$, $q_{sup,i}$, and the like.

On the other hand, $\alpha_{ij}$, $\beta_{ij}$, $\lambda_k$, $\mu_k$, $\kappa_k$, $\eta_i$, $\varepsilon_i$, $\varphi_{ki}$, and $q_{sup,i}$ tend to be effective when used to calculate the initial values of the parameters $\theta^w_{1,1}$ to $\theta^w_{N,S}$, $\theta^v_{1,1}$ to $\theta^v_{N,S}$, and $\theta_b$. The arrangement searching apparatus 100 does not directly use $\alpha_{ij}$, $\beta_{ij}$, $\lambda_k$, $\mu_k$, $\kappa_k$, $\eta_i$, $\varepsilon_i$, $\varphi_{ki}$, and $q_{sup,i}$ as the parameters and uses these to determine the initial values of the parameters $\theta^w_{1,1}$ to $\theta^w_{N,S}$, $\theta^v_{1,1}$ to $\theta^v_{N,S}$, and $\theta_b$. The arrangement searching apparatus 100 may thereby facilitate effective reduction of the power consumption of the data center 210 overall as compared to the case where $\alpha_{ij}$, $\beta_{ij}$, $\lambda_k$, $\mu_k$, $\kappa_k$, $\varepsilon_i$, $\varphi_{ki}$, and $q_{sup,i}$ are directly used as the parameters.

An example of the result of the updating of the parameters of the mixed-integer programming problem by the arrangement searching apparatus 100 will be described with reference to FIG. 19.

Figure 19:
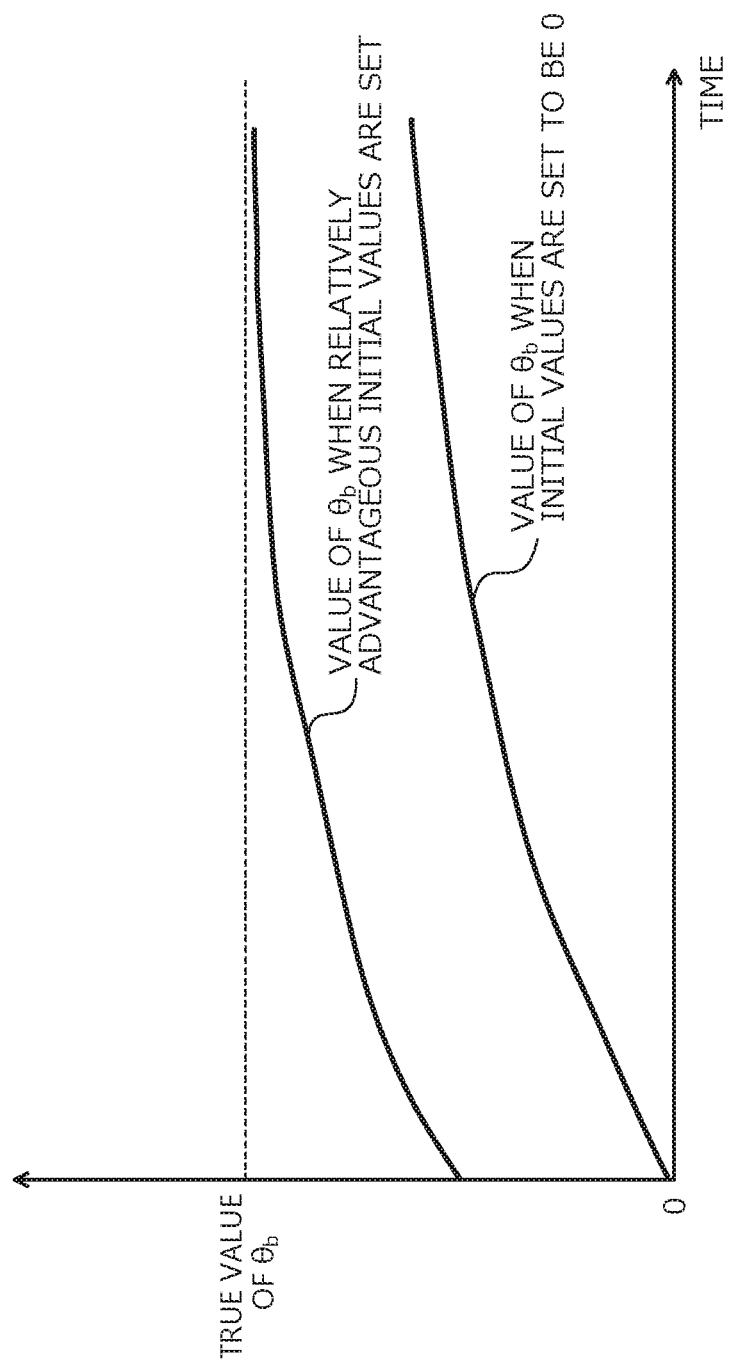
FIG. 19 is an explanatory diagram of an example of a result of updating of parameters of a mixed-integer programming problem by the arrangement searching apparatus 100.

FIG. 19 is an explanatory diagram of an example of the result of the updating of the parameters of the mixed-integer programming problem by the arrangement searching apparatus 100. As described, the arrangement searching apparatus 100 uses the recursive least-squares method every time the arrangement searching apparatus 100 determines the solution of the mixed-integer programming problem and updates the parameters $\theta^w_{1,1}$ to $\theta^w_{N,S}$, $\theta^v_{1,1}$ to $\theta^v_{N,S}$, and $\theta_b$ used in the objective function of the mixed-integer programming problem.

While the parameter $\theta_b$ will be described in the example of FIG. 19, processing is similar for other parameters. In the following description, the value that is the value of the parameter $\theta_b$ that precisely represents the influence on the power consumption of the data center 210 overall, and that is advantageous from the viewpoint of facilitating the reduction of the power consumption of the data center 210 overall may be written as "the true value of the parameter $\theta_b$".

As depicted in FIG. 19, the value of the parameter $\theta_b$ is brought closer to the true value of the parameter $\theta_b$ as the value thereof is updated using the recursive least-squares method. The arrangement searching apparatus 100 may thereby update the parameters used in the mixed-integer programming problem to the more advantageous values using the sequential parameter estimation method.

When the initial value of the parameter $\theta_b$ is defined in accordance with equation (14), the time period and the processing amount necessary for the value of the parameter $\theta_b$ to become close to the true value of the parameter $\theta_b$ are reduced compared to the case where the initial value of the parameter $\theta_b$ is set to be 0. The arrangement searching apparatus 100 may thereby reduce the number of sessions in which relatively disadvantageous values are used as the parameters for the mixed-integer programming problem, and may reduce the power consumption of the data center 210 overall.

A procedure for a process to arrange the virtual machines will be described with reference to FIG. 20.

FIG. 20 is a flowchart of an example of the procedure for the process to arrange the virtual machines. In FIG. 20, when arrangement of the virtual machines is started, the arrangement searching apparatus 100 determines whether the type of the arrangement of the virtual machines is additional arrangement, initial arrangement, or rearrangement (step S2001).

Based on the result of the determination, the arrangement searching apparatus 100 reads the values of the constants and the variables stored in the storing unit 1801, and sets the objective function and the constraint conditions (step S2002). The arrangement searching apparatus 100 solves the mixed-integer programming problem to determine the solution thereof using the solver, based on the read constants, the read variables, the set objective function, and the set constraint conditions (step S2003).

Based on the determined solution, the arrangement searching apparatus 100 arranges the virtual machines (step S2004). The arrangement searching apparatus 100 acquires the actual power consumption of the data center 210 overall in the state where the virtual machines are arranged (step 2005).

Based on the acquired actual power consumption, the arrangement searching apparatus 100 updates the parameters of the mixed-integer programming problem (step S2006). The arrangement searching apparatus 100 causes the arrangement process for the virtual machines to come to an end. The arrangement searching apparatus 100 may thereby arrange the virtual machines to reduce the power consumption of the data center 210 overall.

As described, according to the arrangement searching apparatus 100, the initial values set based on at least any one of the first performance information, the second performance information, the third performance information, and the heat coupling information may be used as the initial values of the parameters. According to the arrangement searching apparatus 100, the arrangement of the plural virtual machines into the plural servers 111 may be determined using the parameters to optimize the power consumption of the facility 110 overall that includes the plural servers 111. According to the arrangement searching apparatus 100, the parameters may be updated using the sequential parameter estimation method.

The arrangement searching apparatus 100 may thereby use the sequential parameter estimation method and update the parameters used for the mixed-integer programming problem to more advantageous values starting from the relatively advantageous initial values. The arrangement searching apparatus 100 may thereby facilitate reduction of the time period necessary for the parameters used for the mixed-integer programming problem to become close to the advantageous values. As a result, the arrangement searching apparatus 100 may reduce the number of sessions in which relatively disadvantageous values are used as the parameters used for the mixed-integer programming problem, and can reduce the power consumption of the facility 110 overall.

According to the arrangement searching apparatus 100, the mixed-integer programming problem that is described as the function of the total size of the virtual machines executed by the servers 111 using the parameters and that has, as an objective function, the power consumption of the facility 110 overall, may be used. According to the arrangement searching apparatus 100, the mixed-integer programming problem may be solved and the arrangement may be determined based on the solution of the mixed-integer programming problem. The arrangement searching apparatus 100 may thereby use the mixed-integer programming problem whose number of the parameters does not vary regardless of the type and the number of the virtual machines to be arranged, and the arrangement searching apparatus 100 enables the updating of the parameters by using the least-squares method.

According to the arrangement searching apparatus 100, the initial values of the parameters that include the initial values concerning the power consumption of the facility 110 overall for the computing resources used by the servers 111 and that are set based on the pieces of the first to the third performance information and the heat coupling information, may be used. The arrangement searching apparatus 100 may thereby start the parameters concerning the power consumption of the facility 110 overall for the computing resources used by the servers 111, from the relatively advantageous values. The arrangement searching apparatus 100 may reduce the time period necessary for the parameters concerning the power consumption of the facility 110 overall for the total size of the virtual machines executed by the servers 111, to become close to the values advantageous from the viewpoint of reducing the power consumption of the facility 110 overall.

According to the arrangement searching apparatus 100, the initial values of the parameters that include the initial values concerning the power consumption of the facility 110 overall for the presence or the absence of the energization of the servers 111 and that are set based on the pieces of the first to the third performance information and the heat coupling information, may be used. The arrangement searching apparatus 100 may thereby start the parameters concerning the power consumption of the facility 110 overall for the presence or the absence of the energization of the servers 111, from the relatively advantageous values. The arrangement searching apparatus 100 may reduce the time period necessary for the parameters concerning the power consumption of the facility 110 overall for the presence or the absence of the energization of the servers 111, to become close to the values advantageous from the viewpoint of reducing the power consumption of the facility 110 overall.

According to the arrangement searching apparatus 100, the initial values of the parameters that include the initial values concerning the power consumption of power constantly consumed by the facility 110 overall and that are set based on the pieces of the second and the third performance information and the heat coupling information as the initial values of the parameters, may be used. The arrangement searching apparatus 100 may thereby start the parameters concerning the power consumption of power constantly consumed by the facility 110 overall, from the relatively advantageous values. The arrangement searching apparatus 100 may reduce the time period necessary for the parameters concerning the power consumption of power constantly consumed by the facility 110 overall, to become close to the values advantageous from the viewpoint of reducing the power consumption of the facility 110 overall.

The arrangement searching method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the recording medium, and executed by the computer. The program may be distributed through a network such as the Internet.

According to an aspect of the present invention, an effect is achieved that the electric power consumption of the overall facility may be optimized.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein an arrangement search program that causes a computer that searches an arrangement of a plurality of virtual machines in a plurality of servers in a facility including the plurality of servers, to execute a process comprising:
setting an initial value of a parameter concerning the arrangement of the plurality of virtual machines in the plurality of servers,
the setting of the initial value of the parameter being based on first performance information, second performance information, third performance information, and heat coupling information, the first performance information being information on power consumption of the plurality of servers, the second performance information being information on power consumption of air conditioning equipment installed in the facility, the third performance information being information on power consumption of power source equipment installed in the facility, the heat coupling information being information on heat coupling among the plurality of servers and among the plurality of servers and the air conditioning equipment; and
updating the parameter by a sequential parameter estimation method, so as to optimize power consumption of the overall facility.

2. The recording medium according to claim 1, the process further comprising
solving a mixed-integer programming problem having, as an objective function, total power consumption of the power consumption of the plurality of servers, the power consumption of the air conditioning equipment, and the power consumption of the power source equipment, described as a function of a total size of the virtual machines executed by the servers using parameters, to determine the arrangement based on a solution of the mixed-integer programming problem.

3. The recording medium according to claim 1, wherein initial values of parameters including initial values concerning the power consumption of the overall facility for a total size of the virtual machines executed by the servers.

4. The recording medium according to claim 1, wherein initial values of parameters including initial values concerning the power consumption of the overall facility with respect to a presence or absence of energization of the servers.

5. The recording medium according to claim 1, wherein initial values of parameters including initial values concerning the power consumption of power constantly consumed by the facility overall.

6. The recording medium according to claim 1, wherein the setting includes setting based on representation of the first performance information, the second performance information, the third performance information and the heat coupling information with each other.

7. The recording medium according to claim 1, wherein the arrangement search program causes the computer to solve a mixed-integer programming problem whose objective function is represented by the following equation:

$$\text{Minimize } \theta^T \begin{bmatrix} w \\ v \\ l \end{bmatrix}$$

where
- w is a vector that has arranged therein as an element, a total size $w_{ij}$ of virtual machines executed by a j-th server in an i-th rack of the facility;
- v is a vector that has arranged therein as an element, $v_{ij}$ representing whether a power source of the j-th server in the i-th rack of the facility is turned on; and
- $\theta^T$ is a vector that has arranged therein as an element, parameters to be coefficients for the elements of w, parameters to be coefficients for the elements of v, and a parameter to be a coefficient for a constant 1, and
- the parameter is any one of the parameters of $\theta^T$.

8. An arrangement search method of searching arrangement of a plurality of virtual machines in a plurality of servers in a facility including the plurality of servers, the arrangement search method comprising:

setting, by a computer, an initial value of a parameter concerning the arrangement of the plurality of virtual machines in the plurality of servers, the setting of the initial value of the parameter being based on first performance information on power consumption of the plurality of servers, second performance information on power consumption of air conditioning equipment installed in the facility, third performance information on power consumption of power source equipment installed in the facility, and heat coupling information on heat coupling among the plurality of servers and among the plurality of servers and the air conditioning equipment; and updating, by the computer, the parameter by a sequential parameter estimation method, so as to optimize power consumption of the overall facility.

9. An arrangement search apparatus configured to search arrangement of a plurality of virtual machines in a plurality of servers in a facility including the plurality of servers, the arrangement search apparatus comprising:

a memory; and a processor coupled to the memory, the processor configured to:

set an initial value of a parameter concerning the arrangement of the plurality of virtual machines in the plurality of servers, the setting of the initial value of the parameter being based on first performance information on power consumption of the plurality of servers, second performance information on power consumption of air conditioning equipment installed in the facility, third performance information on power consumption of power source equipment installed in the facility, and heat coupling information on heat coupling among the plurality of servers and among the plurality of servers and the air conditioning equipment; and update the parameter by a sequential parameter estimation method, so as to optimize power consumption of the overall facility.

* * * * *